United States Patent
Richard

[11] 3,757,286
[45] Sept. 4, 1973

[54] APPARATUS FOR DETECTING AQUATIC ANIMALS

[76] Inventor: Joseph D. Richard, 3613 Loquat Ave., Miami, Fla. 33133

[22] Filed: Aug. 7, 1970

[21] Appl. No.: 61,900

[52] U.S. Cl.................... 340/3 T, 340/3 D, 43/17.1
[51] Int. Cl............................................... G01s 9/70
[58] Field of Search...................... 43/17.1; 340/3 T, 340/3 D

[56] References Cited
UNITED STATES PATENTS

| | | | |
|---|---|---|---|
| 3,491,474 | 1/1970 | Metcalf | 43/17.1 |
| 3,561,150 | 2/1971 | Silchensledt | 43/17.1 |
| 2,821,805 | 2/1958 | Kunze | 340/3 T |
| 3,483,649 | 12/1969 | Klima et al. | 43/17.1 |
| 3,123,798 | 3/1964 | Holloway | 340/3 D |
| 3,231,852 | 1/1966 | Kritz | 340/3 D |

Primary Examiner—Benjamin A. Borchelt
Assistant Examiner—J. V. Doramus
Attorney—Joseph D. Richard

[57] ABSTRACT

A method for detecting shrimp and certain other aquatic animals having specific motional responses when subjected to a pulsed electric field. An instrumented housing, suitable for towing along the sea bottom behind a powered vessel, includes an electrical pulse generator, a suitably spaced electrode array, and an ultrasonic Doppler detection system. Repetitive electrical pulses are discharged between the spaced electrodes as the vehicle is towed along the bottom. As shrimp and other susceptive aquatic animals on or near the sea bottom attempt to escape the influence of the pulsed electric field, their movements are detected by the ultrasonic Doppler system. Shrimp respond by a jumping movement during which relatively high velocities are achieved for brief periods of time. Fishes respond by swimming at moderate velocities. Doppler signals indicative of shrimp and fish are received in the towing vessel. The relatively high pitched Doppler signals caused by jumping shrimp are discriminated from the relatively lower pitched signals caused by fishes. The continuous indication of shrimp or other specific marine animals passing in close proximity to the towed vehicle provides a quantitative basis for evaluating their concentrations and probable catch rates.

8 Claims, 18 Drawing Figures

PATENTED SEP 4 1973 3,757,286
SHEET 1 OF 3
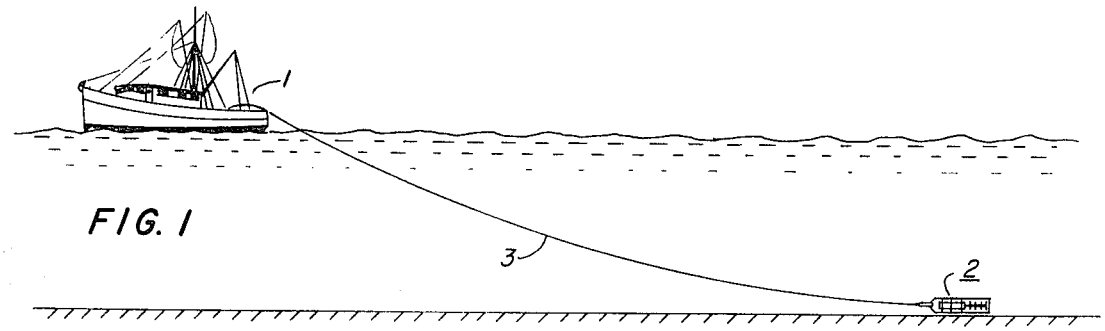
FIG. 1
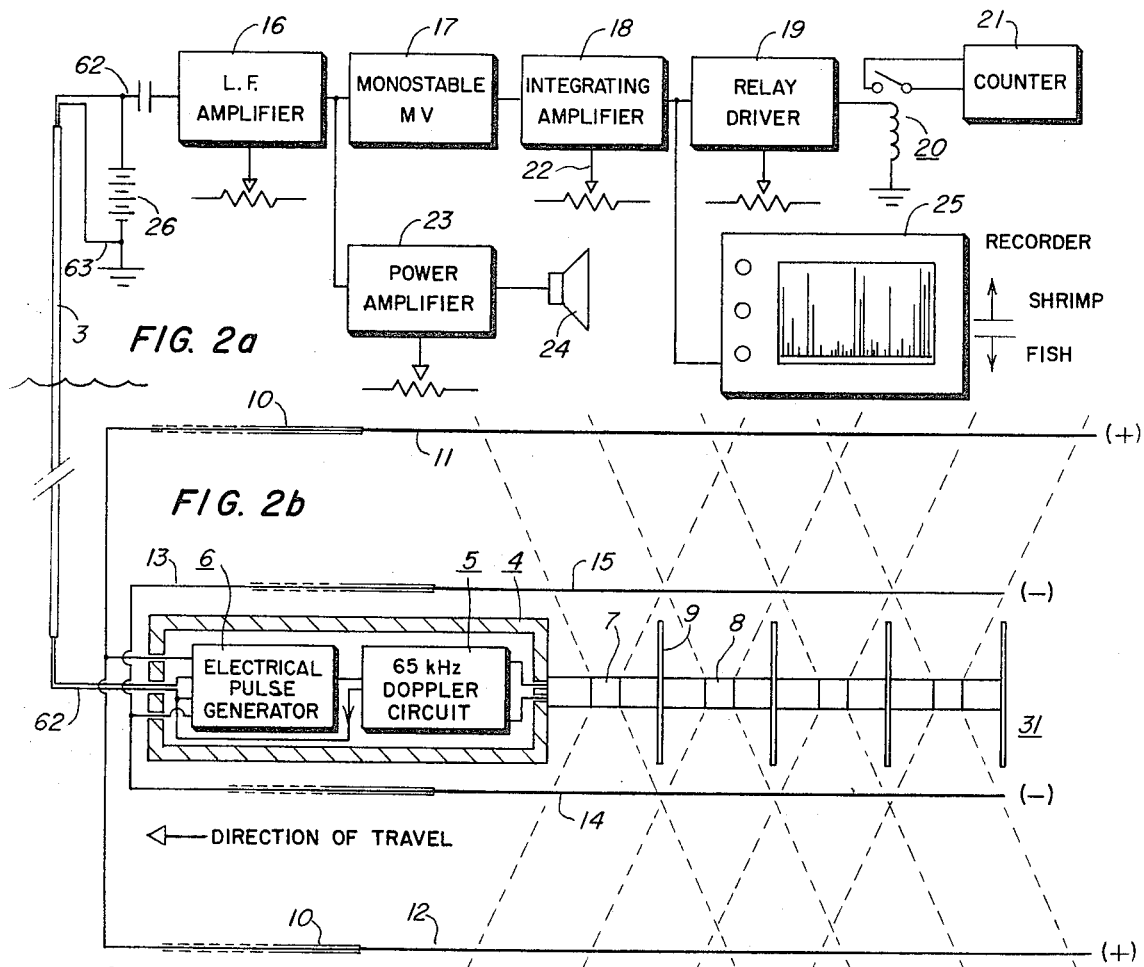
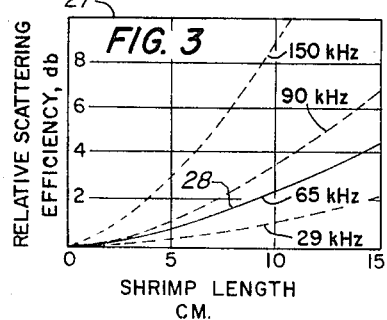
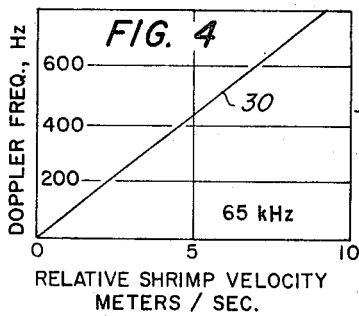
INVENTOR
Joseph D. Richard

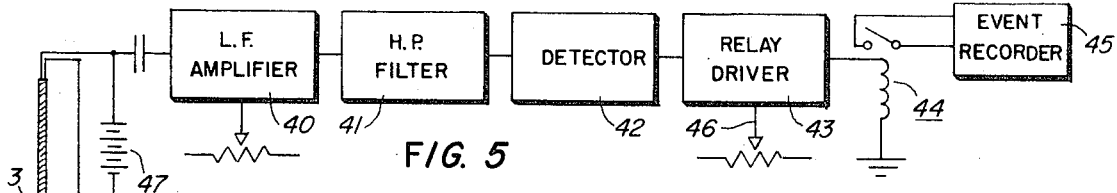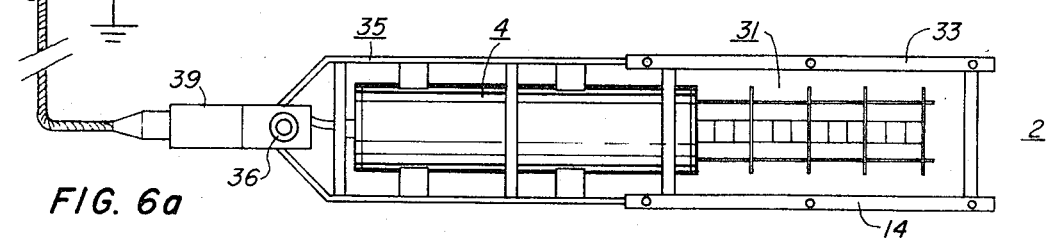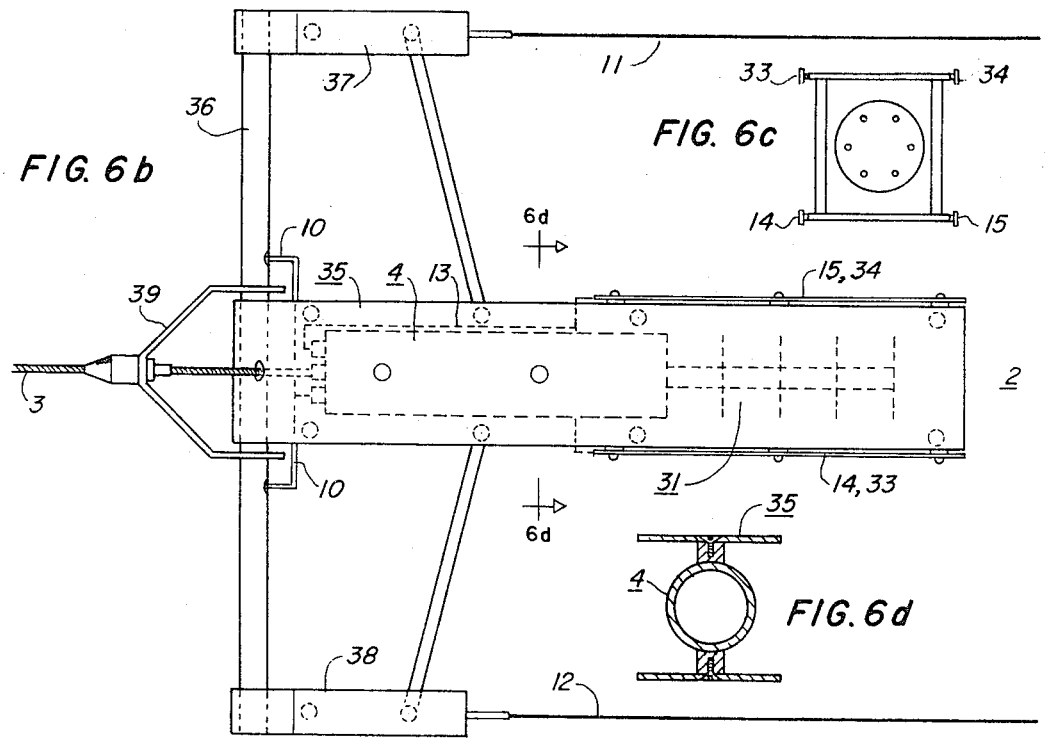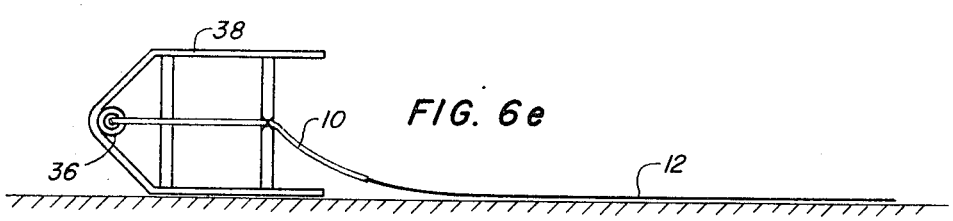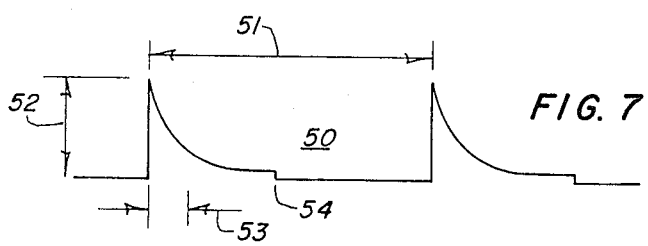

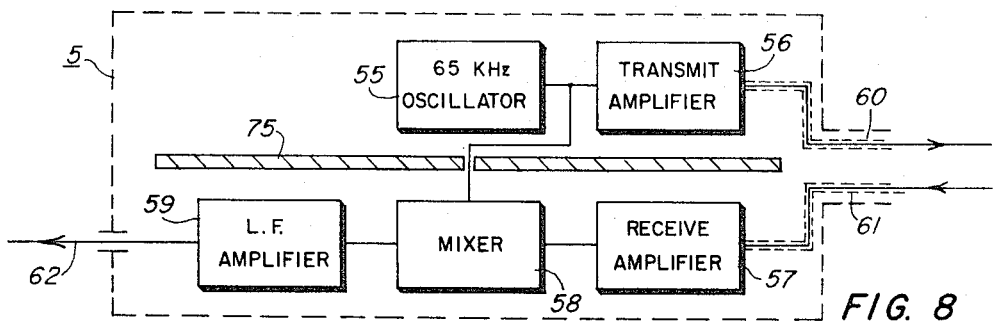
FIG. 8
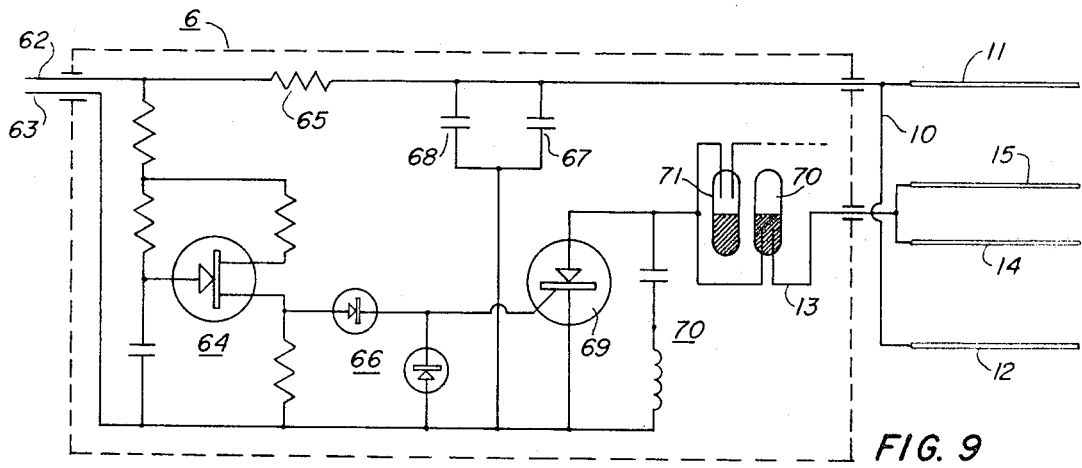
FIG. 9
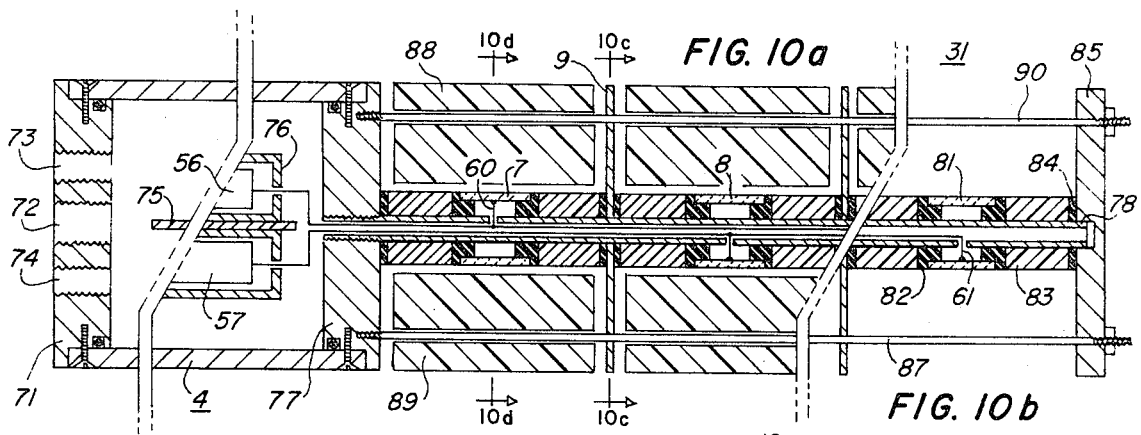
FIG. 10a
FIG. 10b
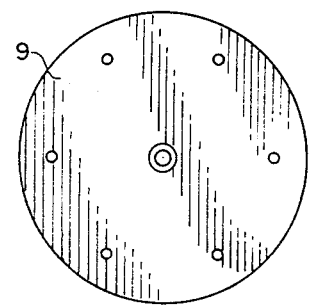
FIG. 10c
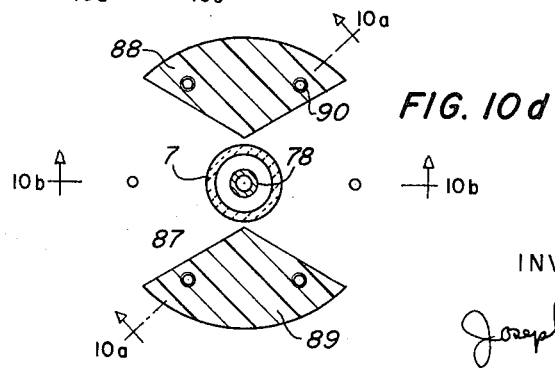
FIG. 10d
INVENTOR
Joseph P. Richard

APPARATUS FOR DETECTING AQUATIC ANIMALS

BACKGROUND OF THE INVENTION

In the past, the techniques used for finding shrimp have been largely a matter of trial and error. The relationships between shrimp distribution and abundance and environmental conditions have never been adequately understood. As a result, new shrimp grounds could not be located efficiently nor could concentrations of shrimp be predicted even within well known fishing grounds. Accordingly, there has been, within the shrimp fishing industry, an urgent need for a practical method for detecting shrimp in their natural habitat which is normally on (or burrowed in) the sea bottom.

Modern shrimp vessels are equipped with conventional pulse echo sounders to locate trawlable bottom, to remain within desired fishing depth, and to avoid obstructions to the trawl gear. This equipment is also of considerable help in locating a mud or soft clay bottom suitable for shrimp. The detection of shrimp is, however, a much more difficult problem and has generally been beyond the capability of pulse echo sonar. Because of their small size and lack of a swim bladder, shrimp make weak targets at typical sonar frequencies. Their poor target strength and proximity to the bottom make their detection with hull-mounted sonar almost impossible. Even if shrimp could be detected with the conventional pulse echo sonar, it would be virtually impossible to distinguish shrimp from the undesirable trash fish with which they are frequently found.

As suitable shrimp detection equipment has been available, the captain of a shrimp vessel has, in the past, usually confined his fishing to known shrimp grounds. He has relied on intuition and experience in deciding where to trawl and on the repetitive use of the trynet for evaluating the concentration of shrimp and trash fish. Most of the major shrimp fisheries are night operations because many species of shrimp burrow into the substrate during daylight and cannot be captured by conventional shrimp trawls. Generally, therefore, fishing starts at sunset and stops at sunrise. During a trawl tow, lasting about three hours on the average, the trynet is normally hauled several times each hour. This permits an estimate of both the trash fish and the shrimp catch. Based on the trynet catches, the captain attempts to stay in relatively high concentrations of shrimp or, as an alternative, to move away from poor areas.

Recently it has been found that a pulsed electric field of about 0.2 volt/cm (or greater) will cause burrowed shrimp to jump up out of the substrate so that they can be captured by a trawl. Shrimp above the bottom also respond with a jumping movement. Subsequently, shrimp trawling gear has been devised which combines an electrical pulse generator with a conventional shrimp trawl to provide a trawling system which is effective during daylight hours.

SUMMARY OF THE INVENTION

The present invention provides a method and apparatus for detecting aquatic animals, particularly shrimp, from a fishing vessel or the like. An instrumented vehicle is described, suitable for towing behind a powered vessel, which includes an electrical pulse generator, a suitably spaced electrode array, and an ultrasonic Doppler detection system. In a preferred embodiment, runners are included so that a sled-like configuration results, thus enabling the towed vehicle to maintain a measure of stability and to pass over minor obstacles when towed along the sea floor. Repetitive electrical pulses are discharged between the spaced electrodes as the vehicle moves along the bottom. Shrimp and other susceptive aquatic animals on or near the sea bottom attempt to escape the influence of the pulsed electrical discharges as the electrodes pass in close proximity. Fish respond by swimming away from the electrical stimulus at moderate velocities. Shrimp respond by a jumping movement during which relatively high velocities are achieved for brief periods of time. The ultrasonic Doppler system detects such movements of nearby aquatic animals so that an output signal is generated which is a function of the velocity of the animal relative to that of the instrumented vehicle moving along the bottom. Thus shrimp and fish can be differentiated by auditioning the amplified and electroacoustically transduced Doppler signal. Alternatively, the abrupt and relatively high-pitched Doppler signals indicative of shrimp can be discriminated by suitable circuitry and each such event (or the accumulated events) graphically displayed to indicate shrimp concentration. In a preferred embodiment, the frequency of the Doppler signal is translated into a corresponding voltage and recorded graphically.

DESCRIPTION OF THE DRAWINGS

FIG. 1 is a schematic view of a fishing vessel towing shrimp detection apparatus according to the present invention.

FIG. 2 is a block diagram of the shrimp detection apparatus and the associated shipboard receiving system.

FIG. 3 is a graph showing the relationship between shrimp size and scattering efficiency for a range of ultrasonic frequencies usable with the shrimp detection apparatus.

FIG. 4 is a graph showing the relationship between shrimp (or other marine animal) swimming velocity and resulting Doppler signal frequency.

FIG. 5 is a block diagram showing an alternate method for discriminating Doppler signals resulting from marine animal movements within a selected velocity range.

FIG. 6 shows various views and sections of a towed vehicle suitable for carrying the shrimp detection apparatus.

FIG. 7 shows characteristics of typical electrical pulses generated within the shrimp detection apparatus.

FIG. 8 is a block diagram of a basic ultrasonic Doppler system suitable for use in the towed shrimp detector.

FIG. 9 is a schematic diagram of an electric pulse generator suitable for use in the towed shrimp detector.

FIG. 10 shows various sectional views of an ultrasonic transducer assembly suitable for use in the towed shrimp detector.

DESCRIPTION OF THE PREFERRED EMBODIMENT

Referring to FIG. 1, a fishing vessel 1 is shown towing a sled-like vehicle 2 along the sea bottom by means of an electrically conductive cable 3. A shrimp detection system, according to the present invention, is mounted within the towed vehicle 2.

FIG. 2 shows an underwater housing 4 containing a Doppler circuit 5 and electrial pulse generator 6. Electrical pulses from the electrical pulse generator 6 are discharged periodically between the spaced outer electrodes 11–12 and inner electrodes 14–15 thus providing an intermittent electric field adjacent to the towed vehicle 2 within which the housing is mounted. The Doppler circuit 5 transmits a substantially continuous ultrasonic signal into the water adjacent the towed vehicle 2 by means of at least one transmitting transducer such as a piezoelectric ceramic cylinder 7. Efficient transmission of ultrasonic energy is obtained by driving the transducer 7 at a frequency corresponding to its radial mode resonance, for example 65 KHz. At least one receiving transducer, such as the piezoelectric ceramic cylinder 8, also resonant at 65 KHz, is used to receive ultrasonic energy reflected from objects adjacent the towed vehicle 2. A metal disk 9 separates the transmitting transducer 7 from the receiving transducer 8 to reduce the direct transmission of energy between the two transducers, and partially to confine the directivity patterns of both transducers laterally outward from the direction of travel of the towed vehicle 2. The directivity pattern of a cylindrical transducer is essentially omnidirectional in a plane perpendicular to the major axis. The directivity pattern in a plane parallel to the major axis depends on the frequency of the signal and on the length of the cylinder. Thus the cylindrical transducers shown in FIG. 2b can be made increasingly directional (laterally to the direction of travel) by increasing the signal frequency or the cylinder length or both. When ultrasonic energy radiated from the transmitting transducer 7 is reflected by a moving object adjacent to, and laterally disposed from, the towed vehicle, and such reflected energy is received by the receiving transducer 8, the resulting Doppler difference frequency is detected by the Doppler circuit 5. The Doppler signal, suitably amplified, is conveyed up the towing cable 3 through the electrical conductor 62. The Doppler signal is amplified by the amplifier 16. The Doppler signal can be further amplified by the power amplifier 23 and made audible by the speaker 24. Each cycle of the Doppler signal triggers the monostable (one shot) multivibrator 17 if the instantaneous signal voltage exceeds some predetermined threshold value. The resulting series of pulses of uniform amplitude and duration from the multivibrator 17 are integrated by the integrating amplifier 18 so that a voltage is derived which is a function of the frequency of the Doppler signal. The output of the integrating amplifier 18 is recorded by the graphic recorder 25. The relative amplitudes of the successive deflections of the graphic record thus indicate the relative velocities of moving objects passing within range of the ultrasonic Doppler detection system. Shrimp and trash fish are thus easily differentiated by their respective peak velocities as displayed by the peak amplitudes of the recorded pulses. As an optical indication of shrimp concentration, the output of the integrating amplifier 18 is amplified by the relay driver 19 so that each occurrence of a reflecting object (such as a jumping shrimp) exceeding predetermined velocity and amplitude threshold values results in the momentary closure of the relay 20 and an additional count on the counter 21.

FIG. 3 shows the relationship between shrimp size and scattering efficiency for various ultrasonic frequencies usable with the shrimp detection system. For example, the increase of scattering efficiency with increasing shrimp length for a 65 KHz signal is shown by the curve 28. The scattering efficiency, Doppler signal frequency, and directivity, all increase as the operating frequency is increased. Thus a relatively high frequency is desirable if shrimp, with their poor target strength, are to be detected effectively. However, if the directivity patterns of the transmitting and receiving transducers are too narrow, only a relatively small area adjacent the towed vehicle will be under ultrasonic Doppler surveillance and many of the shrimp will be passed without detection. In practice, a relatively wide beam-width is preferred if adequate coverage is to be obtained without requiring a large number of transducers and an excessively long transducer assembly.

FIG. 4 shows the relationship 30 between the velocity of moving objects and the resulting Doppler signal frequency for the 65 KHz ultrasonic Doppler system described herein. Here the direction of movement of the reflective object is assumed to be directly away from or toward the transducers.

The frequency of an ultrasonic signal which is received after reflection from a moving object, such as a jumping shrimp, is shifted to a higher frequency when the object is approaching the transducer and to a lower frequency when the object is moving away from the transducer. When a signal of the original frequency is combined with the received reflected signal (as shown in FIG. 8), a difference frequency is derived which is shown by the familiar relationship $$\Delta f = f (2(v) \cos \Theta /c)$$

where $\Delta f$ is the difference frequency (Doppler signal), $f$ the original signal frequency, $V$ the velocity of the reflecting object, $c$ the velocity of propagation of the ultrasonic signal in the medium (Seawater), and $\Theta$ the angle between the direction of the ultrasonic wave and the direction of movement of the reflecting object.

In FIG. 5, an alternate method is shown for discriminating shrimp and other marine animals having lower swimming velocities. The Doppler signal is amplified by the amplifier 40 and frequencies above some predetermined value (such as 200 Hz) are passed by the high-pass filter 41. Doppler signals received by the detector 42 ar converted to corresponding D.C. signals. The D.C. signals are amplified by the relay driver 43 so that the relay 44 is actuated whenever the Doppler signal (passed by the filter 41) exceeds some predetermined threshold amplitude as set by the adjustable potentiometer 46. For example, the jumping movements of shrimp can result in the closure of the relay 44 whenever the size, proximity, and velocity of the shrimp produce an adequate Doppler signal. Each such event is recorded on the event recorder 45. The battery 47 is used to power the underwater portion of the shrimp detection system shown in FIG. 6.

FIG. 6a shows a side view of the towed vehicle 2 including the shrimp detection apparatus. The electrically conducting tow cable 3 is mechanically coupled to the vehicle by means of the yoke 39. Electrical power can thus be conveyed down the tow cable 3 from the battery 47 (or other suitable power source) into the housing 4 mounted within the sled-like framework 35. Electrical Doppler signals derived within the housing 4 are conveyed up the cable 3 to the input of the amplifier 40 of FIG. 5 or the amplifier 16 of FIG. 2. An ultrasonic transducer assembly 31 is shown mounted on the trailing end of the housing 4. The upper left inner electrode 33 is shown attached to, but insulated from, the framework 35. The lower left inner electrode 14 is shown similarly attached to the framework 35.

FIG. 6b shows a top view of the towed vehicle 2 including the shrimp detection apparatus. A tubular crosspiece 36 extends outward horizontally from the leading end of the sled-like framework 35 to attach right and left runners 37 and 38. Right and left outer electrodes 11 and 12 trail behind the right and left runners 37 and 38 respectively. Insulated electrical conductors 10 connect the positive output of the electrical pulse generator 6 (within the housing 4) to both outer electrodes 11 and 12. Insulated electrical conductors 13 connect the negative output of the electrical pulse generator 6 to at least one pair of inner electrodes 14-15 and 33-34. As an alternative, only the lower pair of inner electrodes 14 and 15 can be connected as shown in FIG. 9.

FIG. 6c shows a trailing end view of the towed vehicle 2 including both upper 33-34 and lower 14-15 pairs of inner electrodes.

FIG. 6d shows a sectional view across the sled-like framework 35 and the housing 4.

FIG. 6e shows a side view of the left runner 38 with the trailing left outer electrode 12.

FIG. 7 shows characteristics of typical electrical pulses 50 from the electrical pulse generator 6. The pulse shape, greatly exaggerated in length, is typical of a capacitive discharge. Suitable values are 36 volts for peak amplitude 52; 0.2 second for pulse interval 51; and 500 microseconds (or over) for the pulse duration 53. The turn-off step 54 of the discharge waveform is also shown.

FIG. 8 shows a block diagram of a basic ultrasonic Doppler circuit 5. An oscillator 55 provides a substantially continuous signal of 65 KHz which is amplified by the transmit (power) amplifier 56. The output signal is connected to the ultrasonic transmitting transducers by means of the shielded conductor 60. Signals received by the ultrasonic receiving transducers are connected to the input of the receiving amplifier 57 by means of the shielded conductor 61. Amplified received signals are mixed with a portion of the output signal from the oscillator 55 by the mixer 58 so that relatively low (difference) frequencies result. The low frequency (Doppler) signals are amplified by the amplifier 59 and conveyed to a suitable indicator by means of the insulated conductor 62.

FIG. 9 shows, schematically, a basic electrical pulse generator wherein capacitors are intermittently discharged between spaced electrodes immersed in seawater. As this type of discharge circuit has been used in the past for a variety of purposes, its theory of operation is well known by those skilled in the art. Electrical current through the conductor 62 charges the capacitors 67-68 at a rate limited by the resistor 65. The normally non-conductive condition of the silicon controlled rectifier (SCR) 69 prevents the discharge of the capacitors 67-68 between the spaced electrodes 11-12 and 14-15 which are arrayed in seawater adjacent the towed vehicle previously described. A typical unijunction transistor (UJT) relaxation oscillator circuit 64 is shown for supplying repetitive trigger pulses to the gate electrode of the SCR 69. Each trigger pulse results in the discharge of the capacitors 67-68 through the seawater between the spaced electrodes and through the base electrode of the SCR 69. The electrical resistance between the spaced electrodes in seawater is typically a few ohms depending quite considerably on both temperature and salinity. The diode network 66 protects the UJT 64 from excessive voltage pulses developed on the gate electrode of the SCR 69 during the discharge cycle. The inductance-capacitance series network 70 reactively turns off the SCR 69 within a short time interval, preferably within a few milliseconds, after the discharge is initiated to allow maximum time for recharging the capacitors 67-68. As an alternative mode of operation, the mercury switches 70 and 71 can be used to connect only the lower pair 14-15 of inner electrodes to confine the resulting electric field as close as possible to the sea bottom. Suitable electrical pulses are generated for the present purposes when a capacitance of 50 microfarads is charged to 36 volts and discharged at a repetition rate of 5 pulses per second.

FIG. 10a shows a longitudinal section in the vertical plane through the housing 4 and the ultrasonic transducer assembly 31. Resilient gasket seals 84, plastic spacers 83, resilient transducer spacers 82, ultrasonic transducers (piezoelectric cylinders) 7-8 and 81, and metal shielding disks 9 are alternately stacked, as shown, on the tubular member 78 which projects rearward from the trailing end cover plate 77 of the housing 4. Ultrasonic reflecting wedges 88-89 are spaced above and below each transducer. The entire transducer assembly 31 is clamped together into a substantially rigid structure by means of the tie rods 87-90 and the end plate 85. The shielded electrical conductor 60, within the tubular member 78, connects the inner electrode of the transmitting transducer 7 (and the other transmitting transducers of the assembly) to the output of the transmit amplifier 56. The shielded electrical conductor 61, within the tubular member 78, connects the inner electrode of the receiving transducer 8 (and other receiving transducers of the assembly such as transducer 81) to the input of the receiving amplifier 57. Outer electrodes of both transmitting and receiving transducers are maintained at ground (seawater) potential. Metal enclosures 76 and a dividing partition 75 shield the receiving amplifier 57 from direct radiation from the transmit amplifier 56. The leading end cover plate 71 includes tapped access holes 72-73-74 to accommodate waterproof electrical fittings to connect with the external electrode array and to the shipboard receiving system and power supply.

FIG. 10b shows a longitudinal section in the horizontal plane of the trailing end portion of the ultrasonic transducer assembly 31. The absence of ultrasonic reflector wedges in the horizontal plane allow ultrasonic energy to be transmitted and received most effectively in the horizontal plane. The directivity characteristics of the cylindrical transducers and the vertical positioning of the reflector wedges combine to make the Doppler detection system most sensitive to moving objects laterally disposed (in the horizontal plane) relative to the direction of movement of the towed vehicle. Thus objects moving in response to electrical pulses discharged between the laterally disposed electrode array are most effectively detected.

FIG. 10c shows a shielding disk 9 which separates alternate transmitting and receiving sections of the ultrasonic transducer assembly 31.

FIG. 10d shows a transverse section through the ultrasonic transducer assembly 31 showing the spatial relationships between the cylindrical transducer 7 and the vertically disposed reflector wedges 88 and 89.

Obviously there are many possible variations in the construction and operation of the shrimp detection apparatus described herein. Electric pulses within a wide range of amplitudes and repetition rates are effective. An electric pulse repetition rate of 5 pulses per second assures that shrimp coming within the influence of the electrode array will be stimulated at least twice at an average towing speed of 2.5 knots (130 cm/sec) using the relatively short towed vehicle configuration described herein. However, if similar apparatus is towed at a higher speed, for example behind a helicopter flying at 10 knots, then either a much higher pulse repetition rate or else a much longer electrode array and transducer assembly should be used.

Ultrasonic transducers having other shapes, such as flat (or curved) plates, can be used in an elongated array with the beam axes directed laterally outward in the horizontal plane. Plate transducers, operating in the thickness mode, would involve the use of relatively higher ultrasonic frequencies compared to the cylindrical (radial mode) transducers described herein. For example, a lead zirconate plate 0.6 cm thick would be resonant at about 300 KHz. As mentioned previously, increased scattering efficiency (target strength) as shown in FIG. 3 results from the use of higher ultrasonic frequencies. Correspondingly higher Doppler signal frequencies are also thus obtained. However, the relatively narrower beam-widths concomitant with the use of higher frequencies make it difficult to cover a wide enough area adjacent the towed vehicle.

Most fishes, because of their larger size and the high scattering efficiency of their swimbladder, make a much stronger reflecting target when compared to shrimp. When stimulated by an electric pulse, however, shrimp will respond with a jumping reaction during which a relatively high peak velocity, estimated to be between 5 and 10 meters/second, is achieved for a brief period of time. The maximum swimming velocity of typical fishes normally found with shrimp would seldom exceed 4 meters/second even when stimulated by an electric pulse. Thus, for the apparatus described herein, Doppler signals above about 350 Hz are attributable to shrimp. Doppler signals below about 250 Hz are attributable to fishes and slower swimmers. The above swimming velocities and resulting Doppler signals are relatively approximations only, as peak swimming velocity is dependent on species and body length as well as on the strength of motivational influences such as electric shock.

Although the sled-like construction of the towed vehicle shown in FIG. 6 has proven to be practical, many other configurations would be also suitable. For example, the housing and transducer assembly could be maintained well above the bottom supported by widely spaced runners which serve as electrodes. Other alternatives include instrumented vehicles without runners for towing in mid-water to assess the concentration of aquatic animals such as fishes and squid swimming well above the bottom.

Although the normal response is almost instantaneous, some burrowed shrimp take as long as 0.5 to 1 second to deburrow when stimulated by the electric field. These delayed responses result in some shrimp emerging behind the Doppler field when a relatively short towed vehicle is used. As an alternative, therefore, additional electrode coverage can be included to extend the electric field forward well ahead of the Doppler field.

In the preferred embodiment described herein, an insulated electrical cable (with steel tensile strands) is used for towing to supply electrical power to the towed vehicle and also to convey Doppler signals to the towing vessel. As an alternative, a battery supply can be included within the underwater housing to power the electric pulse generator and the Doppler detector. Doppler signals can be recorded within the housing for later analysis or else conveyed to a surface receiving system either by an acoustic or an ionic conduction data transmission system.

Although shrimp detection and the problems associated therewith are used to describe the operation of this method for detecting aquatic animals, it should be understood that a wide range of other aquatic animals can also be detected including other crustaceans, fishes (particularly demersal fishes), squid and even some bivalve molluscs, such as scallops; all of which respond by a sudden increase in locomotory activity when stimulated by a pulsed electric field of adequate intensity.

As a further alternative, one or more of the structural members of the instrumented vehicle, such as the sled-like framework, or the housing itself, can serve as an electrode. For example, this could eliminate the need for the pairs of inner electrodes shown in the drawings.

While only a single embodiment is shown and described herein, it is understood that many modifications are possible and the invention is not limited to the specific embodiment disclosed nor otherwise except as set forth in the following claims.

1. Apparatus for detecting and discriminating aquatic animals on the basic of their characteristic locomotory responses to an electrical stimulus comprising:
   an instrumented vehicle suitable for towing through an aquatic environment;
   spaced electrodes at least one of which is appended from the said vehicle for electrifying an adjacent volume of water;
   means for intermittently passing electrical current between the said spaced electrodes;
   means for transmitting ultrasonic energy into the water in a wide angle between pattern adjacent the said vehicle;
   means for receiving ultrasonic energy reflected from objects in the water adjacent the said vehicle;
   means for deriving an output signal dependent on the frequency difference between said transmitted and received ultrasonic energy, whereby said output may be characterized to permit the detection and discrimination of various aquatic animals; and
   means for indicating successive output events of the said output signal.

2. Apparatus for detecting aquatic animals as described in claim 1 wherein the said instrumented vehicle includes runners appended therefrom to provide a sled-like configuration suitable for towing on the sea bottom.

3. Apparatus as described in claim 1 wherein the said indicating means is located aboard a powered vessel; and an electrically conductive cable connects the said instrumented vehicle with the said indicating means.

4. Apparatus as described in claim 1 wherein the said indicating means is an amplified difference frequency signal made audible by an electroacoustic transducer.

5. Apparatus as described in claim 1 including a discriminator circuit for selectively passing only difference frequency signals exceeding a predetermined threshold frequency so that movements of objects in the water adjacent the said vehicle are indicated only when a corresponding threshold velocity is exceeded.

6. Apparatus as described in claim 1 including: means for graphically recording the said electrical output signal as a function of elapsed time.

7. Apparatus for detecting and discriminating aquatic animals comprising:
- an instrumented vehicle suitable for towing through the water behind a powered vessel;
- runners appended from the said vehicle to facilitate towing along the sea bottom;
- an electrically conductive cable connecting the said vehicle with the aforementioned powered vessel;
- spaced electrodes appended from the said instrumented vehicle for electrifying an adjacent volume of water;
- means for intermittently passing electrical current through the water between the said electrodes;
- an oscillator for generating electrical signals of an ultrasonic frequency;
- a first transducer for transmitting ultrasonic energy in a wide angle beam pattern into the water adjacent the said vehicle;
- a second transducer having an electrical output in response to received ultrasonic energy reflected from objects in the water adjacent the said vehicle;
- means for amplifying electrical signals from the said second transducer;
- a mixer circuit for combining signals from the said oscillator with the output signal from the said amplifying means to obtain difference frequency signals; and
- means aboard the aforementioned powered vessel for graphically recording successive occurrences of the aforementioned difference frequency signals to indicate the relative concentrations of aquatic animals passing within the influence field of the said spaced electrodes.

8. The method of detecting and discriminating aquatic animals comprising:
- towing an instrumented vehicle through a body of water inhabited by aquatic animals having a locomotory response to an electrical stimulus;
- periodically discharging electrical current through a volume of water adjacent the said vehicle;
- transmitting ultrasonic energy into the water in a wide angle beam pattern adjacent the said vehicle;
- receiving ultrasonic energy reflected by aquatic animals passing adjacent the said vehicle;
- deriving an electrical output signal dependent on the frequency difference between the said transmitted and received ultrasonic energy;
- whereby the presence of susceptive aquatic animals passing within the influence of the said electrical current discharges is indicated by the amplitude and frequency characteristics of the output signal.

* * * * *